United States Patent [19]

Little

[11] Patent Number: 5,071,580

[45] Date of Patent: Dec. 10, 1991

[54] PUMPABLE CORROSION INHIBITOR SLURRIES SUITABLE FOR CHARGING COOLING SYSTEM FILTERS

[75] Inventor: David A. Little, Cary, Ill.

[73] Assignee: W. R. Grace & Co.-Conn., New York, N.Y.

[21] Appl. No.: 251,615

[22] Filed: Sep. 29, 1988

[51] Int. Cl.$^5$ .............................................. C09K 5/00
[52] U.S. Cl. ....................................... 252/71; 252/74; 252/75; 252/76; 252/78.3
[58] Field of Search ...................... 252/73, 75, 76, 77, 252/78.1, 79

[56] References Cited

U.S. PATENT DOCUMENTS

| | | | |
|---|---|---|---|
| 2,119,506 | 5/1938 | Watts | 252/5 |
| 3,231,501 | 1/1966 | Reese | 252/74 |
| 3,505,244 | 4/1970 | Cessna | 252/91 |
| 3,645,402 | 2/1972 | Alexander et al. | 210/266 |
| 3,776,384 | 12/1973 | Offer | 210/209 |
| 3,962,109 | 6/1976 | Oberhofer et al. | 25/146 |
| 4,242,214 | 12/1980 | Lambert, Jr. | 252/75 |
| 4,357,236 | 11/1982 | Krueger | 210/167 |
| 4,404,113 | 9/1983 | Peters et al. | 252/75 |
| 4,444,247 | 4/1984 | Franck et al. | 165/119 |
| 4,455,248 | 6/1984 | Wood | 252/75 |
| 4,482,467 | 11/1984 | Nakamura et al. | 252/70 |
| 4,508,684 | 4/1985 | Huff et al. | 422/8 |
| 4,564,465 | 1/1986 | Bibber | 252/389 R |
| 4,587,028 | 5/1986 | Darden | 252/76 |
| 4,588,513 | 5/1986 | Triebel et al. | 252/76 |
| 4,655,930 | 4/1987 | Kuhn et al. | 210/668 |
| 4,686,058 | 8/1987 | Schwartz et al. | 252/75 |
| 4,842,731 | 6/1989 | Dobrez et al. | 252/73 |

FOREIGN PATENT DOCUMENTS

| | | |
|---|---|---|
| 3225852 | 7/1982 | Fed. Rep. of Germany . |
| 1385888 | 3/1975 | United Kingdom . |
| 1463401 | 5/1975 | United Kingdom . |
| 2138837 | 7/1987 | United Kingdom . |

*Primary Examiner*—Prince E. Willis
*Assistant Examiner*—John F. McNally
*Attorney, Agent, or Firm*—James P. Barr

[57] ABSTRACT

A corrosion inhibitor slurry is disclosed which is suitable for addition to a selected liquid coolant capable of dispersing at least one glycol having from 3 to 5 carbon atoms per molecule. The slurry consists of a mixture of (a) a treatment composition comprising corrosion inhibitor, capable of dispersing in said selected liquid coolant and consisting of solid and, optionally non-solid components; and (b) a liquid vehicle selected from glycols which have 3 to 5 carbon atoms per molecule and disperse in said selected liquid coolant. The treatment composition solids in the slurry are fine particles; the amount of vehicle in the slurry is chosen such that the particles are thoroughly wetted and the slurry both sets and is pumpable; and the amounts of non-solid components of the treatment composition are limited to a total quantity that does not substantially impair the pumping and setting characteristics provided by the particles and liquid vehicle. Cooling system filters charged with said slurries are also disclosed.

18 Claims, No Drawings

PUMPABLE CORROSION INHIBITOR SLURRIES SUITABLE FOR CHARGING COOLING SYSTEM FILTERS

FIELD OF THE INVENTION

The present invention relates to inhibiting and preventing corrosion of metals in cooling systems, and in particular, to dosing cooling systems with corrosion inhibitors.

BACKGROUND OF THE INVENTION

Many cooling systems comprising metallic parts which come into contact with circulating fluids are subject to corrosion of those metallic parts. Water which has excellent heat transfer characteristics is a common cooling fluid used for such systems. However, where there is a concern that water might be subject to freezing conditions, polyhydric alcohols such as ethylene glycol, propylene glycol, and glycerol, or mixtures of water and polyhydric alcohols, are typically employed. While the alcohols are not inherently corrosive to metals, they are normally diluted with water to form the cooling fluid, or are at least exposed to moisture in use. Aeration of the aqueous fluid during use tends to induce corrosive conditions in the fluid which can become quite severe after prolonged use. In addition, rapid fluid flow or vibration can produce cavitation which occurs when flow conditions result in rapid formation and collapse of vapor pockets in the flowing liquid in regions of very low pressure. The resulting high localized shock forces erode protective metal oxide films and accelerate corrosion. Cavitation damage primarily occurs in components made of cast iron, aluminum, and their alloys.

Alcohols such as ethylene glycol, propylene glycol, and diethylene glycol are used as a nonvolatile, permanent-type antifreeze and high temperature transfer fluid in liquid-cooled automotive and stationary internal combustion engines to prevent freezing and overheating and damage to the engine water jacket. The most important property of an engine antifreeze formulation after heat transfer and freezing point depression characteristics is its ability to prevent corrosion in the cooling system. An automotive cooling system contains a variety of metals that are subject to corrosion and/or cavitation such as copper, solder, brass, steel, cast iron, and aluminum. Rust or other solid matter suspended in the coolant may cause erosion damage at points of high coolant velocity. The presence of oxygen and the high temperatures, pressures, and flow rates in automotive cooling systems increase the possibility of erosion and corrosion attack. Cavitation damage may also be a particular problem, for example, in the water pump, cylinder liners, crankcase, and radiator.

Various combinations of inorganic and organic inhibitors have been added to cooling fluids to inhibit corrosion and cavitation and reduce damage to metallic surfaces. There are several difficulties in selecting an effective inhibitor combination for a given system. Each type of metal generally requires a separate corrosion inhibitor. For example, a given inhibitor may be effective to reduce corrosion of ferrous metals, but does not provide effective protection against corrosion of non-ferrous metal components of the system. Further, many conventional corrosion inhibitors are often ineffective in protecting cast iron and aluminum against cavitation, or protect cast iron against cavitation but do not protect aluminum and aluminum alloys against corrosion. Some cast iron cavitation inhibitors may even cause increased corrosion of aluminum and aluminum alloys. Certain cavitation inhibitors may only be effective at high concentrations. Phosphate-based corrosion inhibitor formulations (i.e. formulations where phosphate is an important component of the inhibitor) and borate-based corrosion inhibitor formulations (i.e. formulations where borate is an important component of the inhibitor) are two common types of inhibitor systems employed for cooling system treatment. Typically the formulations contain, in addition to the base components (i.e. phosphate and/or borate), other agents such as corrosion-inhibiting and cavitation-inhibiting compounds, and where desired, deposit control agents, impingement (i.e. erosion) inhibitors, alkalinity control agents, and surfactant compounds including detergents and antifoaming agents, so that the effectiveness for a particular application may be optimized. While phosphate and borate are themselves considered to be pH stabilizing, other pH stabilizing agents may also be employed.

The cooling systems of many liquid cooled engines, such as those used in certain heavy-duty trucks, function for long periods of time without coolant change; and filters may be employed within the engine cooling systems for filtering solid impurities from the circulating coolant. Corrosion inhibitors are generally used to retard the corrosive effect of the circulating liquid on the metallic parts of the cooling system which it contacts. Over long periods of time, however, corrosion inhibitors can react, degrade, or otherwise lose their effectiveness and supplemental dosages must be added. Supplemental cooling additives are discussed, for example, in U.S. Pat. No. 4,717,495.

One method of adding corrosion inhibitors to cooling systems with filters is to provide filters with corrosion inhibitor dosages within so that the corrosion inhibitor is added with the filter change. Typically, in this process, powders or briquettes of corrosion inhibitor solid are loaded manually into the filter. Phosphate or borate-based inhibitors have been used for this purpose with some success. More recently, however, there has been an effort to develop slurries which set under normal manufacturing and storage conditions but are pumpable such that they may be pumped into engine filters and thereafter loaded with the filters into the cooling system. Pumpable slurries are designed to eliminate the need to use solid powders, briquettes, or the like, and to set upon storage both within the filter before the filter is installed, and within any storage vessel from which it is pumped into the filter, so that the potential for running of liquid is minimized. Naturally, a suitable slurry of this type should provide the desired corrosion protection to the engine cooling system after it is loaded into the system with the cooling system filter. It is also desirable that the slurry components are compatible with the cooling fluid.

SUMMARY OF THE INVENTION

This invention provides slurries for charging engine cooling system filters with treatment so that the treatment may be loaded with the filter into the cooling system. Propylene glycol and other higher glycol liquids provide especially advantageous vehicles when used in connection with cooling system treatments such as solid phosphate-based and borate-based corrosion inhibitor formulations. Slurries with paste-like consistency and relatively long shelf life for pumping and storage may be prepared in accordance with this invention.

It is an object of this invention to provide corrosion inhibitor slurry formulations which may be pumped.

It is another object of this invention to provide corrosion inhibitor slurry formulations which are compatible with water and organic liquids typically used as coolants.

It is still another object of this invention to provide a slurry which has a suitable shelf life for storage.

It is yet another object of this invention to provide corrosion inhibitor slurry formulations which may be prepared using conventional phosphate-based and borate-based treatment formulations.

It is a further object of this invention to provide a corrosion inhibitor slurry which sets upon storage.

It is still a further object of this invention to provide slurry-filled cooling system filters suitable for dosing cooling systems with corrosion inhibitor by installing the filter within the cooling system.

DETAILED DESCRIPTION OF THE INVENTION

The corrosion inhibitor slurries of this invention consist of a liquid vehicle selected from liquid glycols having between 3 and about 5 carbons per molecule and a cooling system treatment composition containing corrosion inhibitor. The slurries are suitable for addition to water and many organic liquids typically used as coolants. Accordingly, both the liquid vehicle and the treatment composition used for the slurry should be dispersible in the coolant (i.e. the coolants to be treated with the slurries of this invention are those selected coolants which are capable of dispersing at least one glycol having from 3 to 5 carbon atoms per molecule). Coolants suitable for dosing with the slurries of this invention include ethylene glycol and/or water based commercial coolants (e.g.: PEAK or GM 6038M).

The treatment compositions employed in this invention consist of solid and, optionally, non-solid components, which are capable of dispersing in the selected coolant(s). Typically, the treatment composition itself will be completely solid such as the compositions heretofor used in producing powders and briquettes conventionally employed in charging filters for heavy-duty truck coolant systems. Treatments containing phosphate-based corrosion inhibitor formulations and borate-based corrosion inhibitor formulations are thus preferred. These corrosion inhibitor formulations generally contain other corrosion inhibiting components in addition to phosphate and/or borate. For example, the phosphate-based inhibitors may comprise, in addition to phosphate (e.g. dipotassium or disodium phosphate), one or more additional conventional corrosion inhibitors such as molybdates, nitrites, nitrates, azoles (e.g. mercaptobenzothiazole or tolyltriazole), silicates (e.g. sodium metasilicate), and saturated aliphatic dicarboxylic acids having between 4 and 12 carbon atoms (e.g. adipic acid or sebacic acid) or their salts. Borate-based corrosion inhibitor formulations may comprise, in addition to borate (e.g. sodium tetraborate), the same additional corrosion inhibitors. Of course, both phosphate and borate may be used within these formulations. These conventional treatment compositions may also contain components useful for other purposes: for example, detergents (e.g. xylene sulfonate surfactants), antifoams (e.g. silicone surfactants), and other surfactants; deposit control agents (e.g. polymers such as polyacrylates and acrylate-sulfonated acrylamide copolymers); pH stabilizers (phosphates and borates can be used as buffering agents) and alkalinity-control agents (e.g. potassium hydroxide); impingement inhibitors and dyes. Reference is made to U.S. Pat. No. 4,717,495 for examples of the formulation.

As noted in U.S. Pat. No. 4,71,495, which is hereby incorporated by reference, supplemental cooling additions for diesel engine coolants may be formulated to comprise a buffer, a cavitation liner pitting inhibitor, a metal corrosion inhibitor, a defoamer, and a hot surface deposition and scale inhibitor; and a detergent may also be included to reduce fouling problems. Thus, for example, supplemental additive formulations may include (i) a sodium-free buffer containing at least the compound selected from the group consisting of borate or phosphate salts, (ii) a cavitation liner pitting inhibitor containing at least one compound selected from the group consisting of nitrite and molybdate salts, (iii) a metal corrosion and hot surface corrosion inhibitor containing at least one compound selected from the group consisting of nitrates, silicates and azole compounds, (iv) a defoamer containing at least one compound selected from the group consisting of silicone defoamers, alcohols and glycols, and (v) a hot surface deposition and scale inhibitor containing at least one compound selected from the group consisting of phosphonates, polyacrylates and sulfonate compounds. A detergent containing at least one compound selected from the group consisting of non-ionic and anionic surfactants may also be included where detergency is desired.

The glycol vehicle will typically be the only liquid component of the slurry of this invention. Preferred glycols include propylene glycol, butylene glycol, and 1,2-amylene glycol (i.e. 1,2-pentanediol), with propylene glycol being the most preferred.

The slurries of this invention are pumpable and yet set under normal manufacturing and storage conditions. The term "set" as used herein means the slurry does not flow under conditions of normal room temperature and atmospheric pressure. The term "pumpable" as used herein means the slurry flows at room temperature in response to positive pressure and exhibits a flowing viscosity of about 30,000 centipoises or less. The preferred slurries of this invention have a paste-like consistency. The amounts of vehicle and treatment composition in the slurry will naturally vary according to the specific components used. Generally, the vehicle will be from about 5 to about 20 percent by weight of the slurry, and the treatment composition will be from about 80 to about 95 percent of the slurry.

It is important to provide a treatment composition wherein the solids are particles having a sufficiently small size. Pregrinding of the solids may be practiced. For example they may be ground to pass a 500 micron sieve prior to slurry preparation. Preferably however, the solid components of the treatment composition are sufficiently friable so that the treatment composition can be prepared by mixing the solid components of the treatment composition in a slurry mixer as the slurry is made. The slurry is produced by mixing the treatment composition with sufficient liquid vehicle to provide thorough wetting of the solid treatment composition particles and to provide a slurry with the desired consistency for setting and pumping. For example, the liquid components of the slurry, including the glycol vehicle may be added to a slurry mixer and a premix powder of treatment composition solids may then be added thereto while stirring. The powder is added until the desired consistency is reached with the powder particles thoroughly wetted. However, we prefer to add a powder of the treatment composition solids to the slurry mixer first, and then to add the liquid components to wet the solids after the solids are within the mixer. Whether the solids are added to the mixer before or after the liquid, or they are added together, the size of the solid particles may be reduced during the slurry mixing process. The solids in the resulting slurry should be fine particles. Preferably, at least about 90 percent of the particles in the slurry should have particle diameters of about 10 microns or less after mixing.

A convenient process which may often be used for producing a slurry having particles within the desired range from a solid treatment composition and a glycol vehicle comprises adding all the ingredients of the treatment composition, unground, to a slurry mixer, and then adding the glycol vehicle slowly to the mixer while mixing to allow the solids to "wet mill".

The slurry formulations of this invention are relatively stable upon storage. Not only do the slurries of this invention set upon storage after manufacture, but it has been found that they exhibit relatively long shelf lives in storage when compared to corresponding slurries formed using certain other vehicles such as ethylene glycol or water. The vehicles of this invention such as propylene glycol are considered to generally adsorb onto the slurry particles, while some other vehicles such as ethylene glycol are considered to more readily be absorbed within such particles. Without confining the invention to any theory of operation, it is believed that the glycol vehicles of this invention are generally more suitable for wetting the solid particles of the treatment composition without solubilizing said particles; and that, accordingly, the solid slurry components of this invention are less prone to gradually dissolve in the vehicle and then separate out in the form of relatively large crystals of solid which can adversely affect the consistency of the slurry.

As noted above, the treatment composition is typically solid. Each of its components may also be solid. However, treatment compositions comprising a limited amount of non-solid components (i.e. components such as liquids or gels that flow under moderate stress) may also be used. Where the non-solid components are absorbed within the solid component particles such that the resulting solid can be powdered, mixed, and wetted by the vehicle, the liquid may be added at the premix stage. The treatment composition employed for mixing will thus still be a solid in such instances. Alternately, the non-solid components can be added to the glycol vehicle of this invention before or after the powder is mixed therewith. In such instances, the non-solid component is preferably dispersable in the glycol vehicle. In any case, the amounts of non-solid components of the treatment composition are limited to a total quantity which does not substantially impair the above-described advantageous pumping and setting characteristics of the slurry which are provided by the particles and the liquid vehicles of this invention.

A preferred use for the slurries of this invention is a corrosion inhibiting charge for cooling system filters such as those used to filter the coolant used in certain liquid-cooled heavy-duty truck engines. These filters generally comprise a housing for filter medium; and inlet and outlet means for circulating coolant to and from the filter medium. In practice, one can pump the slurry from its shipping or storage container into the filter housing. The filter may then itself be stored without leakage of the charge through the filter inlet or outlet. After the filter is installed and the coolant is circulated therethrough, the charge will become dispersed in the coolant, thereby inhibiting corrosion of metal parts which come into contact with the coolant. The slurry-charged filters may be used to provide the cooling system with an initial dose of corrosion inhibitor. However, it will be evident that the filters will be particularly suitable for providing booster dosages of corrosion inhibitor with a change of filters.

Practice of the invention will be come further apparent from the following non-limiting example:

EXAMPLE I

A solid premix treatment composition comprising a conventional-type phosphate-based corrosion inhibitor formulation was prepared by mixing thirteen solid ingredients in a powder mixer in the following proportions:

| | |
|---|---|
| Dipotassium phosphate, anhydrous | 34.00 parts |
| Potassium nitrate | 18.00 parts |
| Sodium molybdate dihydrate | 8.10 parts |
| Sodium nitrite | 6.75 parts |
| Disodium adipate | 5.40 parts |
| Mercaptobenzothiazole (obtained as unoiled reagent from Uniroyal) | 5.40 parts |
| Sodium metasilicate pentahydrate | 4.50 parts |
| Tolyltriazole (obtained 100% active as Cobratec TT-100 from PMC Specialties Group, Inc.) | 3.60 parts |
| Sodium xylene sulfonate (powder) | 2.70 parts |
| Polyacrylate (obtained 100% active as Goodrite K-739 from B. F. Goodrich) | 0.54 parts |
| Acrylate-sulfonated acrylamide copolymer (obtained 90% active as Endcor 4623 from W. R. Grace & Co.) | 0.54 parts |
| Silicone surfactant (obtained 100% active as Dow Corning 544 from Dow Chemicals) | 0.36 parts |
| Polyethyleneoxide (obtained 100% active as Polyox WSR-301 from Union Carbide) | 0.11 parts |
| TOTAL | 90.00 parts |

It is noted that this solid premix corresponds to a large extent with compositions disclosed in U.S. Pat. No. 4,717,495. The silicone surfactant component of the premix is itself a liquid, but when added to the other premix components was readily absorbed within the solid mixture. The mixture was preground to a powder having particles of less than about 50 microns in size.

Propylene glycol was added to a multi-blade slurry mixer and the powdered premix was slowly added. The slurry was stirred until the powder particles were further reduced in size and wetted thoroughly. A slurry of the desired paste-like consistency was obtained at 90 parts of powdered premix per 10 parts of propylene glycol.

The slurry set (i.e. did not run) after mixing and could be transferred to a shipping drum either mechanically or under positive pressure sufficient to induce flowing.

A slurry prepared in accordance with this Example was charged from a shipping drum into cooling system filters by using a hydraulic ram to apply pressure to the slurry within the drum, and thereby pump the slurry through piping and into the filter. It is evident that the charged filter may then be stored without leakage of charge. It will be further evident that since the slurry of Example I is compatible with both water and typical alcohol coolants, the corrosion inhibitor will readily disperse into a cooling system as such a coolant circulates through the filter during operation.

Additional studies were done at a pilot plant using ethylene glycol as a vehicle for a corrosion-inhibitor formulation. It was observed that ethylene glycol slurries could only be formulated with up to approximately 80% solids, and that above about 80% solids the ethylene glycol was absorbed without wetting the solids. Moreover, at about 75% solids ethylene glycol slurries set into a hard mass within about 24 to 48 hours from preparation, thus indicating low storage stability; and at about 65% solids ethylene glycol slurries separated, leaving a liquid layer and a hard mass. In contrast propylene glycol slurries with 80% to 92% solids did not generally separate; and such slurries have stayed pumpable for several months.

It will be appreciated by those skilled in the art that slurries similar to the propylene glycol slurry illustrated above may be prepared in accordance with this invention using other treatment compositions and/or other glycol vehicles as described above.

The Example describes a particular embodiment of the invention. Other embodiments will become apparent to those skilled in the art from a consideration of the specification or practice of the invention disclosed herein. It is understood that modifications and variations may be practiced without departing from the spirit and scope of the novel concepts of this invention. It is further understood that the invention is not confined to the particular formulations and examples herein illustrated, but it embraces such modified forms thereof as come within the scope of the following claims.

What is claimed is:

1. A corrosion inhibitor slurry suitable for addition to a selected liquid coolant, said coolant being capable of dispersing at least one glycol having from 3 to 5 carbon atoms per molecule, said slurry containing solid particles wetted by a liquid vehicle and consisting of a mixture of:
   (a) from about 80 to 95 percent by weight of a treatment composition comprising corrosion inhibitor, capable of dispersing in said selected liquid coolant and consisting of either solid or both solid and non-solid components; and
   (b) from about 5 to about 20 percent by weight of a liquid vehicle selected from glycols which have 3 to 5 carbon atoms per molecule and disperse in said selected liquid coolant; the treatment composition solids being fine particles wherein about 90 percent of the particles in the slurry have particle diameters of about 10 microns or less after mixing; the amount of vehicle being chosen such that the particles are thoroughly wetted and the slurry sets and flows at room temperature in response to a positive pressure; and the amounts of non-solid components of the treatment composition being limited to a total quantity that does not substantially impair said pumping and setting characteristics provided by the particles and liquid vehicle.

2. The corrosion inhibitor slurry of claim 1 wherein the liquid vehicle is selected from propylene glycol, butylene glycol, and 1,2-amylene glycol.

3. The corrosion inhibitor slurry of claim 1 wherein the treatment composition contains non-solid components which are absorbed within the particles of solid component.

4. The corrosion inhibitor slurry of claim 1 wherein the treatment composition consists entirely of solid components.

5. The corrosion inhibitor slurry of claim 1 wherein the treatment composition comprises a borate-based corrosion inhibitor formulation.

6. The corrosion inhibitor slurry of claim 1 wherein the treatment composition comprises a phosphate-based corrosion inhibitor formulation.

7. The corrosion inhibitor slurry of claim 6 wherein the vehicle is propylene glycol.

8. The corrosion inhibitor slurry of claim 6 wherein the treatment composition further comprises at least one of detergents, antifoams, surfactants, deposit control agents, ph stabilizers, alkalinity control agents, impingement inhibitors, and dyes.

9. The corrosion inhibitor slurry of claim 1 wherein the liquid vehicle is propylene glycol and the treatment composition comprises a formulation including (i) a sodium-free buffer containing at least one compound selected from the group consisting of borate or phosphate salts, (ii) a cavitation liner pitting inhibitor containing at least one compound selected from the group consisting of nitrite and molybdate salts, (iii) a metal corrosion and hot surface corrosion inhibitor containing at least one compound selected from the group consisting of nitrates, silicates and azole compounds, (iv) a defoamer containing at least one compound selected from the group consisting of silicone defoamers, alcohols and glycols, and (v) a hot surface deposition and scale inhibitor containing at least one compound selected from the group consisting of phosphonates, polyacrylates and sulfonate compounds.

10. A corrosion inhibitor slurry suitable for addition to a selected liquid coolant capable of dispersing at least one glycol having from 3 to 5 carbon atoms, which slurry contains solid particles wetted by a liquid vehicle and is produced by:
   (a) from about 80 to 95 percent providing a treatment composition comprising corrosion inhibitor, capable of dispersing in said selected liquid coolant, and consisting of either solid or both solid and non-solid components; and
   (b) from about 5 to 20 percent mixing said treatment composition with a liquid vehicle selected from glycols which have from 3 to 5 carbon atoms and disperse in said selected liquid coolant, until the solids in the slurry are fine particles wherein about 90 percent of the particles in the slurry have particle diameters of about 10 microns or less after mixing which are thoroughly wetted, and the resulting slurry contains from about 80 to about 95 percent by weight of said treatment composition and from about 5 to about 20 weight percent of said vehicle, sets and flows at room temperature in response to a positive pressure; the amounts of non-solid components of the treatment composition being limited to a total quantity that does not substantially impair said pumping and setting characteristics provided by the particles and liquid vehicle.

11. The corrosion inhibitor slurry of claim 10 wherein any non-solid component of the treatment composition is absorbed within the particles of solid component such that the treatment composition employed for mixing is solid.

12. The corrosion inhibitor slurry of claim 11 wherein the treatment composition comprises a corrosion inhibitor formulation selected from borate-based and phosphate-based corrosion inhibitor formulations.

13. The corrosion inhibitor slurry of claim 12 wherein the liquid vehicle is selected from propylene glycol, butylene glycol, and 1,2-amylene glycol.

14. The corrosion inhibitor slurry of claim 13 wherein the treatment composition comprises a phosphate-based corrosion inhibitor formulation and at least one of detergents, antifoams, surfactants, deposit control agents, ph stabilizers, alkalinity control agents, impingement inhibitors, and dyes.

15. The corrosion inhibitor slurry of claim 14 wherein the treatment composition consists entirely of solid components.

16. The corrosion inhibitor slurry of claim 14 wherein the treatment composition is about 90 weight percent of the slurry and the vehicle is about 10 weight percent of the slurry.

17. The corrosion inhibitor slurry of claim 15 herein the vehicle is propylene glycol.

18. The corrosion inhibitor slurry of claim 17 wherein the treatment composition comprises a formulation including (i) a sodium-free buffer containing at least one compound selected from the group consisting of borate or phosphate salts, (ii) a cavitation liner pitting inhibitor containing at least one compound selected from the group consisting of nitrite and molybdate salts, (iii) a metal corrosion and hot surface corrosion inhibitor containing at least one compound selected from the group consisting of nitrates, silicates and azole compounds, (iv) a defoamer containing at least one compound selected from the group consisting of silicone defoamers, alcohols and glycols, and (v) a hot surface deposition and scale inhibitor containing at least one compound selected from the group consisting of phosphonates, polyacrylates and sulfonate compounds.

* * * * *